(12) United States Patent
Saruwatari et al.

(10) Patent No.: US 7,887,955 B2
(45) Date of Patent: Feb. 15, 2011

(54) NONAQUEOUS ELECTROLYTE BATTERY, BATTERY PACK AND VEHICLE

(75) Inventors: Hidesato Saruwatari, Saku (JP); Yasuhiro Harada, Yokohama (JP); Hiroki Inagaki, Kawasaki (JP); Norio Takami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 879 days.

(21) Appl. No.: 11/880,040

(22) Filed: Jul. 19, 2007

(65) Prior Publication Data

US 2008/0070115 A1  Mar. 20, 2008

(30) Foreign Application Priority Data

Jul. 25, 2006  (JP)  ............... 2006-202383

(51) Int. Cl.
  *H01M 2/14*  (2006.01)
  *H01M 10/40*  (2006.01)
  *H01M 4/48*  (2010.01)
(52) U.S. Cl. .................. 429/246; 429/211; 429/231.1; 429/247
(58) Field of Classification Search .................. None
  See application file for complete search history.

(56) References Cited

U.S. PATENT DOCUMENTS

| | | | |
|---|---|---|---|
| 6,465,125 B1 * | 10/2002 | Takami et al. ................ | 429/127 |
| 6,544,682 B1 | 4/2003 | Takami et al. ................ | 429/62 |
| 2005/0058896 A1 * | 3/2005 | Nomura et al. ............. | 429/142 |
| 2005/0064282 A1 | 3/2005 | Inagaki et al. ............... | 429/121 |
| 2005/0069777 A1 | 3/2005 | Takami et al. ............... | 429/245 |
| 2005/0221173 A1 | 10/2005 | Tatebayashi et al. .......... | 429/60 |
| 2005/0221187 A1 | 10/2005 | Inagaki et al. ............. | 429/231.8 |
| 2005/0221188 A1 | 10/2005 | Takami et al. ............ | 429/218.1 |
| 2006/0046155 A1 | 3/2006 | Inagaki et al. ................ | 429/331 |
| 2006/0068272 A1 | 3/2006 | Takami et al. ................ | 429/122 |
| 2006/0134520 A1 | 6/2006 | Ishii et al. .................... | 429/223 |
| 2006/0216600 A1 | 9/2006 | Inagaki et al. ................. | 429/96 |
| 2006/0257746 A1 | 11/2006 | Inagaki et al. ............ | 429/231.1 |
| 2007/0009794 A1 | 1/2007 | Takami et al. ................ | 429/163 |
| 2007/0009797 A1 | 1/2007 | Takami et al. ............ | 429/218.1 |

(Continued)

FOREIGN PATENT DOCUMENTS

JP  4-332483 A  11/1992

(Continued)

OTHER PUBLICATIONS

Search Report dated Dec. 2, 2008 from corresponding JP 2006-202383.

(Continued)

*Primary Examiner*—John S Maples
(74) *Attorney, Agent, or Firm*—Ohlandt, Greeley, Ruggiero & Perle, L.L.P.

(57) ABSTRACT

A nonaqueous electrolyte battery includes an electrode group and a nonaqueous electrolyte. The electrode group has a laminated structure in which positive electrodes and negative electrodes are alternately interposed between overlapped parts of a separator folded in a zigzag form. A Gurley value of an outermost layer of the separator is larger than that of an inner layer. The battery satisfyies the following equation (1):

$$3\times10^{-5} \leq (X/Y) \leq 1.5\times10^{-3} \qquad (1)$$

wherein X is a rated resistance [mΩ] of the nonaqueous electrolyte battery and Y is a rated capacity [mAh] of the nonaqueous electrolyte battery.

20 Claims, 10 Drawing Sheets

U.S. PATENT DOCUMENTS

| | | | |
|---|---|---|---|
| 2007/0009798 A1 | 1/2007 | Inagaki et al. | 429/231 |
| 2007/0009801 A1 | 1/2007 | Inagaki et al. | 429/218.1 |
| 2007/0059592 A1 | 3/2007 | Takami et al. | 429/161 |
| 2007/0059602 A1 | 3/2007 | Morishima et al. | 429/223 |
| 2007/0072080 A1 | 3/2007 | Inagaki et al. | 429/231 |
| 2007/0231690 A1 | 10/2007 | Fujita et al. | 429/218.1 |
| 2007/0231693 A1 | 10/2007 | Inagaki et al. | 429/231.1 |
| 2007/0231702 A1 | 10/2007 | Fujita et al. | 429/247 |
| 2007/0281214 A1 | 12/2007 | Saruwatari et al. | 429/231.95 |
| 2008/0076030 A1 | 3/2008 | Inagaki et al. | 429/330 |
| 2008/0176142 A1 | 7/2008 | Inagaki et al. | 429/330 |
| 2008/0241687 A1 | 10/2008 | Ishii et al. | 429/218.1 |

FOREIGN PATENT DOCUMENTS

| | | |
|---|---|---|
| JP | 2001-102033 | 4/2001 |
| JP | 2001-266848 A | 9/2001 |
| JP | 2002-110225 A | 4/2002 |
| JP | 2002-252036 A | 9/2002 |
| JP | 2002-352862 A | 12/2002 |
| JP | 2003-323878 A | 11/2003 |
| JP | 2004-193116 A | 7/2004 |
| JP | 2005-011540 A | 1/2005 |
| JP | 2005-093077 | 4/2005 |
| JP | 2005-093078 A | 4/2005 |
| JP | 2005-122940 A | 5/2005 |
| JP | 2005-243455 A | 9/2005 |
| JP | 2006-032874 A | 2/2006 |
| JP | 2006-107812 A | 4/2006 |
| JP | 2006-190531 A | 7/2006 |
| JP | 2007-103352 A | 4/2007 |
| JP | 2007-305464 A | 11/2007 |
| WO | WO 2004/019433 A1 | 3/2004 |

OTHER PUBLICATIONS

U.S Appl. No. 11/687,844, filed Mar. 19, 2007, Fujita.

* cited by examiner

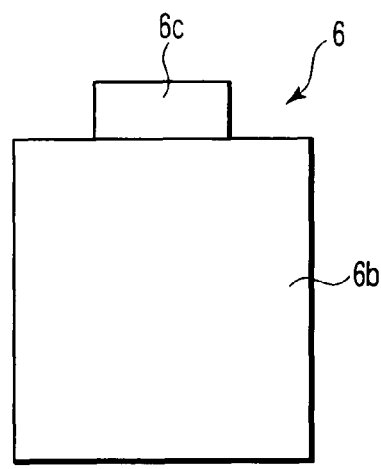
F I G. 3
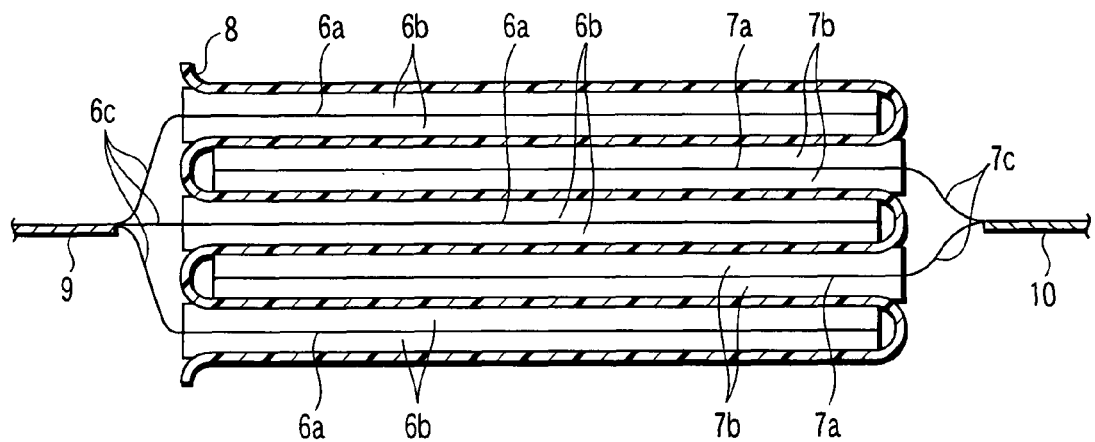
F I G. 4

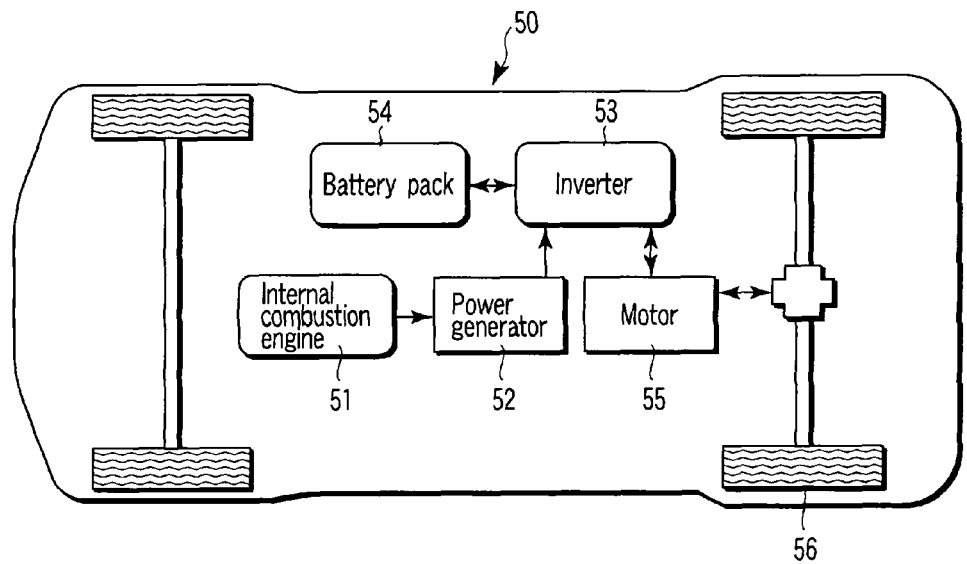
F I G. 10
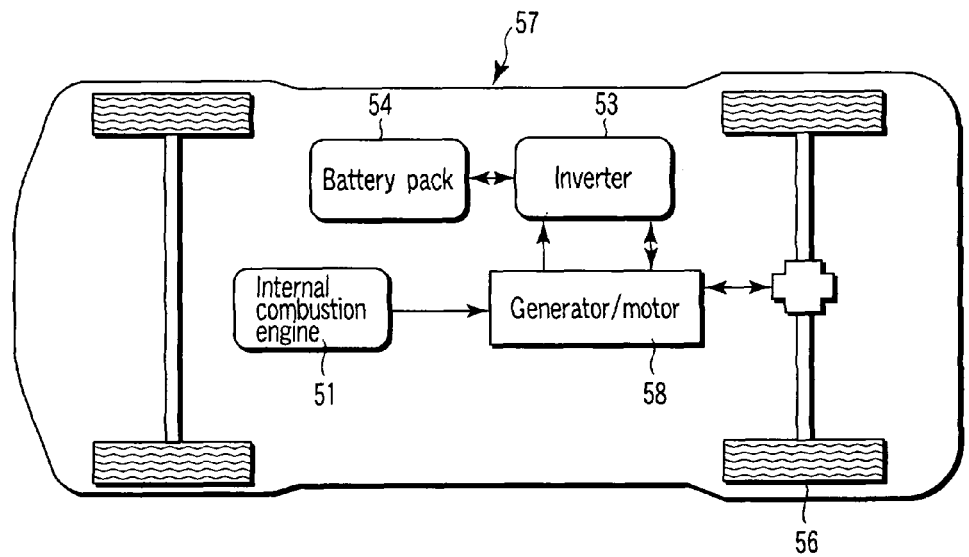
F I G. 11

NONAQUEOUS ELECTROLYTE BATTERY, BATTERY PACK AND VEHICLE

CROSS-REFERENCE TO RELATED APPLICATIONS

This application is based upon and claims the benefit of priority from prior Japanese Patent Application No. 2006-202383, filed Jul. 25, 2006, the entire contents of which are incorporated herein by reference.

BACKGROUND OF THE INVENTION

1. Field of the Invention

The present invention relates to a nonaqueous electrolyte battery, a battery pack using the nonaqueous electrolyte battery and a vehicle using the nonaqueous electrolyte battery.

2. Description of the Related Art

When a charge-discharge cycle of battery is repeated under such a large current, for example, exceeding 5 C, the cycle performance of the battery deteriorates more than in the case of charge-discharge cycle under a current of 1 C due to heat generation of the battery itself. A method in which the resistance of a battery is reduced to suppress the heat generation of the battery has been carried out so far as shown in, for example, JP-A 2001-102033 (KOKAI). However, even if any measures are taken to promote lowering of resistance, the following problem cannot be solved. That is, the heat generation of the battery is increased if current becomes large and the large-current cycle performance deteriorates.

On the other hand, a nonaqueous electrolyte secondary battery described in JP-A 2005-93077 (KOKAI) uses an electrode coiled body formed by winding a laminate of a positive electrode, a negative electrode and two types of separators. JP-A 2005-93077 (KOKAI) discloses a method in which a first separator having an air permeability of 180 sec/100 cm$^3$ or more is disposed on the outside periphery of the negative electrode and a second separator having an air permeability of 120 sec/100 cm$^3$ or less is disposed on the inside periphery of the negative electrode, in order to avoid over charge and thermal runaway of the battery at the time of abnormal heating.

BRIEF SUMMARY OF THE INVENTION

According to a first aspect of the present invention, there is provided a nonaqueous electrolyte battery comprising:

an electrode group having a laminated structure in which positive electrodes and negative electrodes are alternately interposed between overlapped parts of a separator folded in a zigzag form, a Gurley value of an outermost layer of the separator being larger than that of an inner layer; and a nonaqueous electrolyte, the battery satisfying the following equation (1):

$$3 \times 10^{-5} \leq (X/Y) \leq 1.5 \times 10^{-3} \quad (1)$$

wherein X is a rated resistance [mΩ] of the nonaqueous electrolyte battery and Y is a rated capacity [mAh] of the nonaqueous electrolyte battery.

According to a second aspect of the present invention, there is provided a battery pack comprising a nonaqueous electrolyte battery, the battery comprising:

an electrode group having a laminated structure in which positive electrodes and negative electrodes are alternately interposed between overlapped parts of a separator folded in a zigzag form, a Gurley value of an outermost layer of the separator being larger than that of an inner layer; and a nonaqueous electrolyte, the battery satisfying the following equation (1):

$$3 \times 10^{-5} \leq (X/Y) \leq 1.5 \times 10^{-3} \quad (1)$$

wherein X is a rated resistance [mΩ] of the nonaqueous electrolyte battery and Y is a rated capacity [mAh] of the nonaqueous electrolyte battery.

BRIEF DESCRIPTION OF THE SEVERAL VIEWS OF THE DRAWING

FIG. 3 is a plan view showing a positive electrode used in the nonaqueous electrolyte battery of FIG. 1;

FIG. 4 is a side view typically showing an electrode group having a laminated structure used in the nonaqueous electrolyte battery according to the first embodiment;

FIG. 10 is a typical view showing a series hybrid car according to a third embodiment;

FIG. 11 is a typical view showing a parallel hybrid car according to the third embodiment;

DETAILED DESCRIPTION OF THE INVENTION

First Embodiment

Figure 1:
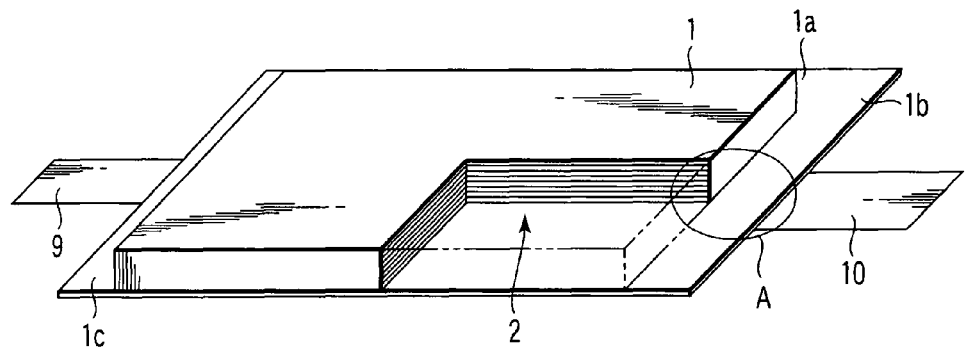
FIG. 1 is a partially cutaway perspective view showing a nonaqueous electrolyte battery according to a first embodiment.

According to an embodiment, a nonaqueous electrolyte battery excellent in large-current performance can be obtained. Studies have been made to reduce cycle deterioration during a cycle operation under a large current, and as a result, the following result has been found. Specifically, it has been found that if the following equation (1) is satisfied when a nonaqueous electrolyte battery comprises a laminate-type electrode group produced using a separator folded in a zigzag form, the large-current cycle performance is improved without impairing the output performance under a large current by making the Gurley value of the outermost layer larger than that of an inner layer in the separator folded in a zigzag form.

$$3\times10^{-5} \leq (X/Y) \leq 1.5\times10^{-3} \quad (1)$$

wherein X is a rated resistance [mΩ] of the nonaqueous electrolyte battery and Y is a rated capacity [mAh] of the nonaqueous electrolyte battery.

A nonaqueous electrolyte battery generates heat when passing a large current. The accumulation of heat at this time is larger in the inside of the battery when the battery uses an electrode group having a laminated structure in which a band-like separator is folded in a zigzag form and a positive electrode and a negative electrode are inserted alternately into spaces between the overlapped parts of the separator. It is considered that this accumulation of heat and the shrinkage of the separator which is induced from this accumulation of heat are major causes of the deterioration in cycle performance.

It is known that if the Gurley value of the outermost layer of the separator is made to be larger than that of the inner layer, this has an adverse effect on the large-current performance. The inventors of the present invention have found that this separator structure ensures that the heat caused by a large-current cycle is solely generated in the outermost layer and it is expected that the accumulation of heat in the inside of the electrode group can be eased. Then, the inventors of the present invention have discovered that if the Gurley value of the outermost layer is made to be larger than that of the inner layer in the separator when (X/Y) is designed to be $3\times10^{-5}$ to $1.5\times10^{-3}$ (mΩ/mAh), a rise in temperature inside of the electrode group in a large-current cycle is limited and also the impregnation degree of a nonaqueous electrolyte has little effect on the resistance of a battery. This results in an achievement of such an effect unexpected from known technologies that the large-current cycle performance is improved without impairing the output performance under a large current. (X/Y) is more preferably in the range of $5\times10^{-5}$ to $1\times10^{-3}$ [mΩ/mAh].

In a battery having (X/Y) less than $3\times10^{-5}$ [mΩ/mAh], the generation of heat caused by a large-current cycle is fundamentally small. Therefore, if the Gurley value of the outermost layer is made larger than that of the inner layer in the separator, the influence of a reduction in the impregnation of the separator with a nonaqueous electrolyte largely emerges and as a result, the output performance under a large current deteriorates. On the other hand, if a battery having (X/Y) exceeding $1.5\times10^{-3}$ [mΩ/mAh] is operated in a large-current cycle, its discharge is finished in a short time because the resistance of the battery is large.

Here, the rated resistance is the maximum compensation value of a battery resistance $R_{cell}$ [mΩ] given by the following equation (2).

$$R_{cell} [mΩ] = (10\ C - 1\ C)/(V_{10\ C} - V_{1\ C}) \quad (2)$$

wherein $V_{1\ C}$ [V] is a voltage of the battery 0.2 seconds after the battery having a half-charged state is discharged in an amount of 1 C [A], and $V_{10\ C}$ [V] is a voltage of the battery 0.2 seconds after the battery having a half-charged state is discharged in an amount of 10 C [A].

Also, the rated capacity is the minimum compensation value of the capacity of a battery when the battery is discharged at a rate of 0.2 C from a fully charged state to the cut-off voltage.

It is to be noted that C is a current value capable of discharging the design capacity of a battery in an hour. The design capacity of the battery is calculated from the weight of an active material to be packed and a theoretical capacity per weight of the active material.

As measures taken to make (X/Y) fall in the range represented by the above equation (1), a method may be exemplified in which the resistance of a battery is decreased. Because the resistance of a battery is the sum of the resistances of battery elements, it is necessary to decrease the resistance component of each element. First, the electrode group having a laminated structure using a separator folded in a zigzag form can more reduce the resistance of a battery than an electrode group having a laminated structure in which separators are each interposed between the positive electrode and the negative electrode, because the positions of the positive electrode and negative electrode are fixed.

The density of the positive electrode of this electrode group is designed to be 3.4 to 3.6 g/cm³. When the density is less than 3.4 g/cm³, the contact resistance among the active materials is increased. When the density exceeds 3.6 g/cm³, the adhesion of the electrode active material to a current collector is reduced, resulting in an increase in the contact resistance between the active material and the current collector. The amount of active material per unit area of the current collector can be decreased by making the density of the positive electrode 3.4 to 3.6 g/cm³. As a result, an apparent ion diffusion distance in the positive electrode can be shortened, thereby further decreasing the resistance of the battery.

In a nonaqueous electrolyte battery, some coating film is formed on the surface of the electrode by the reaction of the electrode with the nonaqueous electrolyte in the initial charging stage. This coating film has electric resistance. It is possible to set (X/Y) to a value falling within the range represented by the equation (1) by trying to reduce the resistance of the coating film formed in the initial charging stage on the surface of the electrode in addition to the definition of the structure of the electrode group and the density of the positive electrode. A lithium-titanium oxide is superior to a carbonaceous material in the ability of receiving lithium and therefore, if the initial charging condition is set to the following condition when the lithium-titanium oxide is used as a negative electrode material, a coating film having a low resistance is easily obtained.

The environmental temperature in the initial charging stage is designed to be as low as 5 to 20° C. and preferably 10 to 20° C. At the same time, the constant current in the initial charging stage is designed to be within the range of 0.05 to 0.2 C and preferably 0.1 to 0.15 C.

The value of (X/Y) is easily designed to be within the range represented by the above formula (1) by combining the above measure with the measures as described in the following (A) or (B).

(A) A tab is connected to each positive electrode and negative electrode constituting the laminate-type electrode group to thereby reduce a current path from the collector to the tab.

(B) The resistance is reduced by increasing the air permeability of the separator.

An embodiment according to the present invention will be explained with reference to the drawings.

Figure 2:
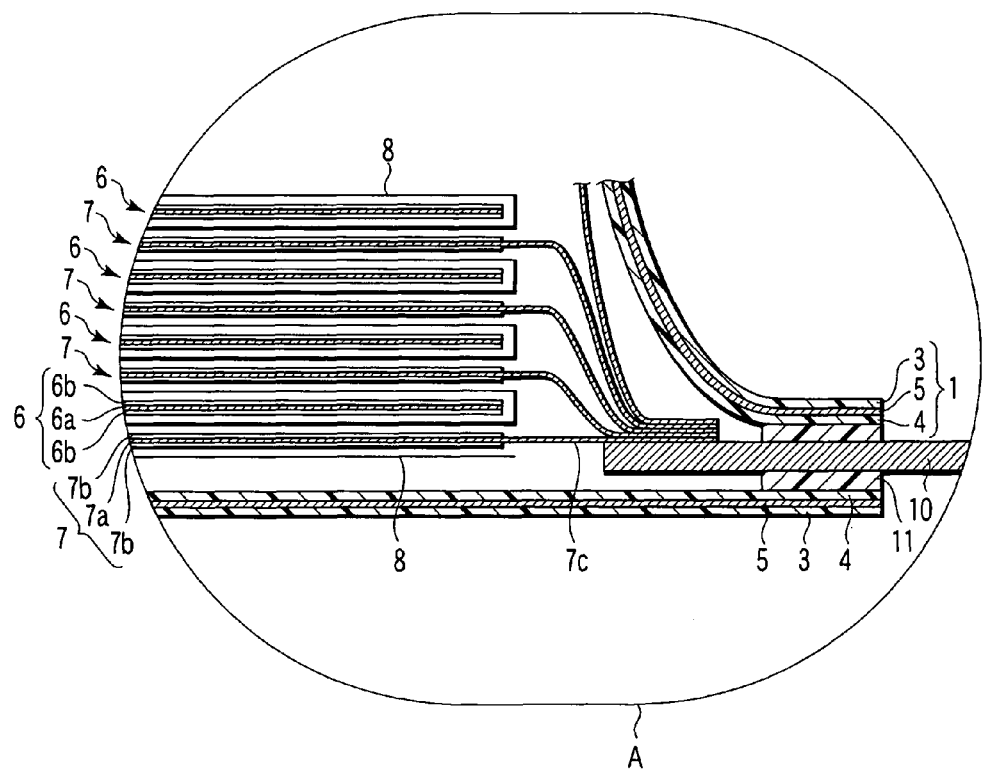
FIG. 2 is an enlarged sectional view showing the A-part of FIG. 1.

As shown in FIG. 1, a laminate-type electrode group 2 is housed in a container 1 made of a laminated film. As shown in FIG. 2, the laminated film is provided with a resin layer 3, a thermoplastic resin layer 4 and a metal layer 5 disposed between the resin layer 3 and the thermoplastic resin layer 4. The thermoplastic resin layer 4 is positioned on the inner surface of the container 1. Heat seal parts 1a, 1b and 1c are formed by thermal fusion of the thermoplastic resin layer 4 on one long side and both short sides of the laminated film container 1. The container 1 is sealed by these heat seal parts 1a, 1b and 1c. As shown in FIG. 2, the laminate-type electrode group 2 has a structure in which a positive electrode 6 and a negative electrode 7 are laminated alternately through a separator 8. Plural positive electrodes 6 are present and are each provided with a positive electrode current collector 6a and a positive electrode layer 6b formed on each side of the positive electrode current collector 6a. Plural negative electrodes 7 are present and are each provided with a negative electrode current collector 7a and a negative electrode layer 7b formed on each side of the negative electrode current collector 7a.

In the positive electrode 6, as shown in FIG. 3, a protrusion is formed in the vicinity of the center of one short side of the positive electrode current collector 6a and functions as a positive electrode lead 6c. Similarly, in the negative electrode 7, a protrusion is formed in the vicinity of the center of one short side of the negative electrode current collector 7a and functions as a negative electrode lead 7c.

As shown in FIG. 4, the electrode group 2 has a laminated structure in which the band-like separator 8 is folded in a zigzag form and the positive electrode 6 and the negative electrode 7 are alternately inserted into the overlapped parts of the separator. In FIG. 4, the positive electrode 6, negative electrode 7, positive electrode 6, negative electrode 7 and positive electrode 6 are sandwiched between the overlapped parts of the separator 8 folded in a zigzag form in this order from the bottom. The positive electrode leads 6c project from the separator 8 and connected to a positive electrode lead tab 9 by, for example, welding in the state where they are tied up in a bundle. On the other hand, each of the negative electrode leads 7c projects from the separator 8 in a direction opposite to the projecting direction of the positive electrode leads 6c. Also, the negative electrode leads 7c are connected to a negative electrode lead tab 10 by, for example, welding in the state where they are tied up in a bundle. With such a structure in which the welded part of the positive electrode leads 6c and the positive electrode lead tab 9 and the welded part of the negative electrode leads 7c and the negative electrode lead tab 10 are disposed outside the separator 8 in this manner, heat is easily radiated from the inside of the electrode group and the position of the separator 8 is firmly secured, whereby the thermal shrinkage of the separator is reduced, resulting in an improvement in large-current cycle performance.

The end of the negative electrode lead tab 10 is drawn to the outside through the heat seal part 1b of the container 1. Both surfaces of the negative electrode lead tab 10 are facing the thermoplastic resin layer 4 constituting the heat seal part 1b. An insulating film 11 is interposed between each surface of the negative electrode lead tab 10 and the thermoplastic resin layer 4 to improve the bonding strength between the heat seal part 1b and the negative electrode lead tab 10. Examples of the insulating film 11 may include films formed from a material obtained by adding an acid anhydride to a polyolefin containing at least one of polypropylene and polyethylene.

The end of the positive electrode lead tab 9 is drawn to the outside through the heat seal part 1c of the container 1. An insulating film 11 is interposed between the positive electrode lead tab 9 and the thermoplastic resin layer 4 to improve the bonding strength between the heat seal part 1c and the positive electrode lead tab 9. With such a structure in which the positive electrode lead tab 9 is drawn in a direction opposite to the direction in which the negative electrode lead tab 10 is drawn, the position of the separator is secured more easily. Therefore, heat radiation effect is easily obtained. At this time, it is preferable that in each positive electrode, the area of the welded part of the positive electrode lead tab 9 and the positive electrode lead 6c is made to be 0.2 to 5% of the area of the positive electrode layer 6b and in each negative electrode, the area of the welded part of the negative electrode lead tab 10 and the negative electrode lead 7c is made to be 0.2 to 5% of the area of the negative electrode layer 7b. The ratio of the area of the welded part of the positive electrode or the negative electrode is less than 0.2%, there is a likelihood that the effect of promoting heat radiation cannot be obtained. Also, the ratio of the area of the welded part of the positive electrode or negative electrode exceeds 5%, there is a possibility of being disadvantageous to energy density. Also, the area of the positive electrode layer 6b, the area of the negative electrode layer 7b and the area of each welded part are calculated using a plan view obtained by projecting the reaction surface in the electrode group from the above.

Here, for the welding, various methods such as ultrasonic welding, laser welding and resistance welding may be adopted.

The nonaqueous electrolyte battery will be explained for every member in detail.

1) Separator

As the separator, one in which the Gurley value of the outermost layer is larger than that of the inner layer is used. When the separator is positioned on the outermost layer of the laminate-type electrode group, this separator is regarded as the outermost layer separator. Also, when the positive electrode or the negative electrode is positioned on the outermost layer of the laminate-type electrode group, the separator positioned at the most outside in the laminate-type electrode group is regarded as the outermost layer separator.

Figure 5:
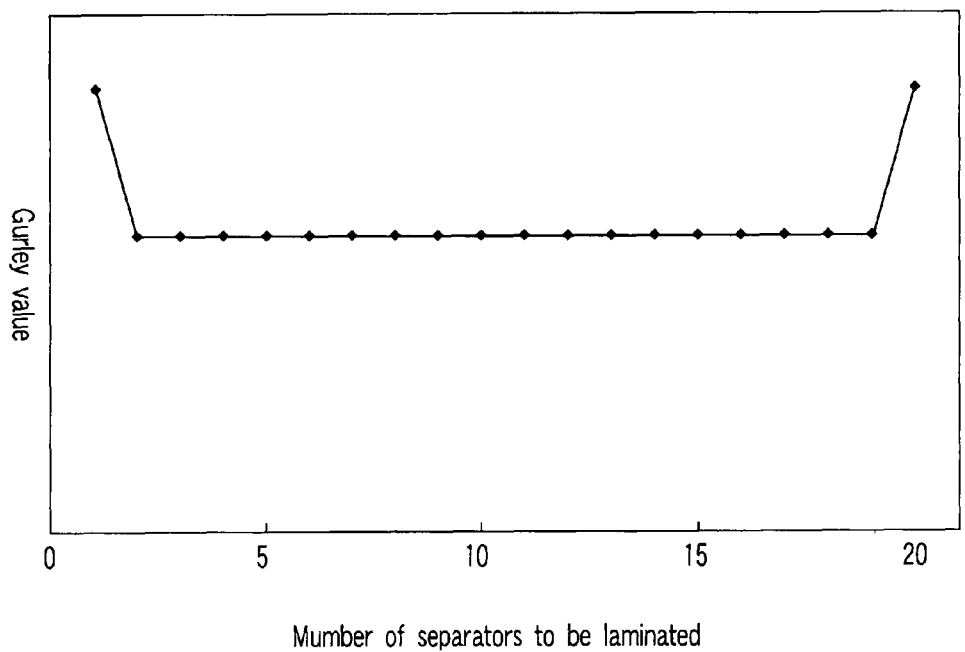
FIG. 5 is a performance diagram showing the relationship between the number of laminations of a separator and the Gurley value.

Separators positioned at the side inner than the outermost layer separator are regarded as inner layer separators. FIG. 5 shows an example of the relationship of the number of separator layers constituting the laminate-type electrode group and the Gurley value of each layer. In the case of FIG. 5, the number of separators is 20 and therefore, separators in the first and twentieth layers are the outermost layer separators. Separators in the second to nineteenth layers are inner layer separators. As shown in FIG. 5, when each Gurley value of the first and twentieth layer separators is larger than each Gurley value of the second to nineteenth layer separators, it is regarded that the Gurley value of the outermost layer is larger than that of the inner layer. It is only necessary that the Gurley value of the outermost layer is higher than that of the inner layer and the Gurley values of the inner layers may vary.

The Gurley value of each separator is measured by dismantling the laminate-type electrode group and sampling a part of each separator layer. Also, the Gurley value is measured according to JIS P 8117: 1998.

The Gurley value of the outermost layer is preferably made larger by 0.1 to 20% than that of the inner layer. When the difference in the Gurley value is less than 0.1%, there is a likelihood that the effect of improving the large-current cycle performance is insufficiently obtained. When the difference in the Gurley value exceeds 20%, there is a possibility of exerting an adverse influence on the performance of the battery. A more preferable range is 0.5 to 10%. A difference d (%) between the Gurley value of the inner layer and the Gurley value of the outermost layer is calculated from the following equation (3).

$$d = \{(A\max - B\min)/B\min\} \times 100 \qquad (3)$$

Among the Gurley values of all separator layers constituting the laminate-type electrode group, the maximum value is Amax and the minimum value is Bmin.

Each Gurley value of the outermost layer and the inner layer is preferably in the range of 50 to 300 [sec/100 cc]. When the Gurley value is less than 50 [sec/100 cc], there is a likelihood that the safety is impaired. When the Gurley value exceeds 300 [sec/100 cc], there is a possibility that the large-current cycle performance cannot be improved because the separator generates a large amount of heat in a large-current cycle. The Gurley value is more preferably in the range of 70 to 200 [sec/100 cc].

The separator preferably has the characteristics that an increase in Gurley value when it is allowed to stand at 80° C. for 3 hours is in the range of 0.1 to 5% whether it is in the outermost layer or in the inner layer. This makes it possible to most preferably obtain the effect of improving a large-current cycle performance. When the increase rate is less than 0.1%, the shutdown effect of the separator is reduced and there is a likelihood of deterioration in performance in a hot plate test. When the increase rate exceeds 5%, there is a possibility of deterioration in large-current cycle performance. The increase rate is more preferably in the range of 0.1 to 3%. The increase rate G (%) of the Gurley value is calculated according to the following equation (4).

$$G=(G_1/G_2) \times 100 \quad (4)$$

wherein $G_1$ is a Gurley value after the separator is allowed to stand at 80° C. for 3 hours and $G_2$ is a Gurley value before the separator is allowed to stand in that condition.

Examples of the material of the separator may include, though not particularly limited to, polyethylene, polypropylene, cellulose, polyvinylidene fluoride (PVdF) and polyethylene terephthalate (PET). As the type of material, one or two or more types may be used. Also, examples of the separator may include porous films and nonwoven fabrics made of synthetic resin.

The Gurley value of the separator can be controlled by, for example, the thickness of the separator in addition to heat treating conditions and stretching conditions for manufacturing the separator.

2) Positive Electrode

This positive electrode comprises a positive electrode current collector and a positive electrode layer which is supported on one or both surfaces of the above current collector and contains an active material, a conductive agent and a binder.

This positive electrode is manufactured, for example, by adding the conductive agent and the binder to the positive electrode active material, suspending the mixture in a proper solvent and applying the suspension to a current collector such as an aluminum foil, followed by drying and pressing to make a band-like electrode.

Examples of the positive electrode active material include various oxides and sulfides. Specific examples of the positive electrode active material include manganese dioxide ($MnO_2$), iron oxide, copper oxide, nickel oxide, lithium-manganese composite oxide (for example, $Li_xMn_2O_4$ or $Li_xMnO_2$), lithium-nickel composite oxide (for example, $Li_xNiO_2$), lithium-cobalt composite oxide ($Li_xCoO_2$), lithium-nickel-cobalt composite oxide {for example, $LiNi_{1-y-z}Co_yM_zO_2$ (where M is at least one element selected from the group consisting of Al, Cr and Fe), $0 \leq y \leq 0.5$, $0 \leq z \leq 0.1$}, lithium-manganese-cobalt composite oxide {for example, $LiMn_{1-y-z}Co_yM_zO_2$ (where M is at least one element selected from the group consisting of Al, Cr and Fe), $0 \leq y \leq 0.5$, $0 \leq z \leq 0.1$}, lithium-manganese-nickel composite oxide {for example, $LiMn_xNi_xM_{1-2x}O_2$ (where M is at least one element selected from the group consisting of Co, Cr, Al and Fe, $\frac{1}{3} \leq x \leq \frac{1}{2}$), for example, $LiMn_{1/3}Ni_{1/3}Co_{1/3}O_2, LiMn_{1/2}Ni_{1/2}O_2$}, spinel type lithium-manganese-nickel composite oxide ($Li_xMn_{2-y}Ni_yO_4$), lithium phosphates having an olivine structure (for example, $Li_xFePO_4$, $Li_xFe_{1-y}Mn_yPO_4$ and $Li_xCoPO_4$), iron sulfate ($Fe_2(SO_4)_3$) and vanadium oxide (for example, $V_2O_5$). Specific examples of the positive electrode active material also include inorganic or organic materials. The organic materials, for example, electroconductive polymers such as polyaniline and polypyrrole, and disulfide type polymers are exemplified. The inorganic materials, for example, sulfur (S) and carbon fluoride are exemplified. The above x, y and z whose preferable ranges are not described above are each preferably in the range of 0 to 1.

More preferable examples of the material of the positive electrode for secondary batteries include lithium-manganese composite oxides, lithium-nickel composite oxides, lithium-cobalt composite oxides, lithium-nickel-cobalt composite oxides, lithium-manganese-nickel composite oxides, spinel type lithium-manganese-nickel composite oxides, lithium-manganese-cobalt composite oxides and lithium iron phosphate. A high battery voltage is obtained by these positive electrode active materials.

Examples of the above conductive agent include acetylene black, Ketjen Black, graphite and cokes.

Examples of the above binder include polytetrafluoroethylene (PTFE), polyvinylidene fluoride (PVdF) and fluorine-based rubber.

The proportions of the above positive electrode active material, conductive agent and binder are preferably in the range of 80 to 95% by weight, in the range of 3 to 20% by weight and in the range of 2 to 7% by weight, respectively.

It is desirable for the positive electrode current collector to be formed of an aluminum foil or an aluminum alloy foil. It is desirable for the aluminum foil or the aluminum alloy foil forming the positive electrode current collector to have an average crystal grain size not larger than 50 µm. It is more desirable for the average crystal grain size to be not larger than 30 µm, and furthermore desirably not larger than 5 µm. Where the average crystal grain size of the aluminum foil or the aluminum alloy foil forming the positive electrode current collector is not larger than 50 µm, the mechanical strength of the aluminum foil or the aluminum alloy foil can be drastically increased to make it possible to press the positive electrode with a high pressure. It follows that the density of the positive electrode can be increased to increase the battery capacity.

The average crystal grain size can be obtained as follows. Specifically, the texture of the current collector surface is observed with an electron microscope so as to obtain the number n of crystal grains present within an area of 1 mm×1 mm. Then, the average crystal grain area S is obtained from the formula "$S=1 \times 10^6/n \, (\mu m^2)$", where n denotes the number of crystal grains noted above. Further, the average crystal grain size d (µm) is calculated from the area S by formula (A) given below:

$$d=2(S/\pi)^{1/2} \quad (A)$$

The aluminum foil or the aluminum alloy foil having the average crystal grain size not larger than 50 µm can be complicatedly affected by many factors such as the composition of the material, the impurities, the process conditions, the history of the heat treatments and the heating conditions such as the annealing conditions, and the crystal grain size can be adjusted by an appropriate combination of the factors noted above during the manufacturing process.

It is desirable for the aluminum foil or the aluminum alloy foil to have a thickness not larger than 20 µm, more desirably not larger than 15 µm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

3) Negative Electrode

This negative electrode comprises a negative electrode current collector and a negative electrode layer which is supported on one or both surfaces of the current collector and contains an active material, a binder and, if necessary, a conductive agent. This negative electrode is manufactured, for example, by adding a binder to a powdery negative electrode active material, suspending the mixture in a proper solvent and applying the resulting suspension to a metal current collector such as a copper foil, followed by drying and pressing to make a band-like electrode.

As the negative electrode active material, materials which insert and release lithium ions are preferable. Examples of the negative electrode active material may include a lithium metal, lithium alloy, carbonaceous material and metal compound.

Examples of the lithium alloy include a lithium-aluminum alloy, lithium-zinc alloy, lithium-magnesium alloy, lithium-silicon alloy and lithium-lead alloy.

Examples of the carbonaceous materials which insert and release lithium ions may include natural graphite, artificial graphite, cokes, vapor-grown carbon fiber, mesophase pitch based carbon fiber, spherical carbon and resin-baked carbon. More preferable examples of the carbonaceous material include vapor-grown carbon fiber, mesophase pitch based carbon fiber and spherical carbon. The above carbonaceous material preferably has the characteristics that the layer spacing $d_{002}$ derived from (002) reflection of X-ray diffraction is 0.340 nm or less.

Examples of the above metal compound include metal oxides, metal sulfides and metal nitrides.

Examples of the metal oxide include titanium-containing complex oxides, for example, amorphous tin oxides such as $SnB_{0.4}P_{0.6}O_{3.1}$, tin silicon oxides such as $SnSiO_3$, silicon oxides such as SiO and tungsten oxides such as $WO_3$. Among these compounds, titanium-containing complex oxides are preferable.

Examples of the titanium-containing complex oxides may include lithium-titanium oxides and titanium-based oxides containing no lithium when the oxide is synthesized. Examples of the lithium-titanium oxide may include lithium titanate having a spinel structure and lithium titanate having a ramsdellite structure. Examples of lithium titanate having a spinel structure may include $Li_{4+x}Ti_5O_{12}$ (x varies in the range of $-1 \leq x \leq 3$ according to a charge or discharge reaction). Examples of lithium titanate having a ramsdellite structure may include $Li_{2+y}Ti_3O_7$ (y varies in the range of $-1 \leq y \leq 3$ according to a charge or discharge reaction). Examples of the titanium-based oxide include $TiO_2$ and metal complex oxides containing Ti and at least one element selected from the group consisting of P, V, Sn, Cu, Ni and Fe. It is desirable for $TiO_2$ to be of anatase type and to have a low crystallinity caused by a heat treating temperature of 300 to 500° C. Examples of these metal complex oxides containing Ti and at least one element selected from the group consisting of P, V, Sn, Cu, Ni and Fe may include $TiO_2$—$P_2O_5$, $TiO_2$—$V_2O_5$, $TiO_2$—$P_2O_5$—$SnO_2$ and $TiO_2$—$P_2O_5$—MeO (Me is at least one element selected from the group consisting of Cu, Ni and Fe). To be more specific, it is desirable for the microstructure of the metal complex oxide to include a crystal phase and an amorphous phase or a single phase formed of an amorphous phase. Such a micro-structure can outstandingly improve the cycle performance. Among these compounds, lithium-titanium oxides and metal complex oxides containing Ti and at least one element selected from the group consisting of P, V, Sn, Cu, Ni and Fe are preferable.

Examples of the metal sulfide include titanium sulfide such as $TiS_2$, molybdenum sulfide such as $MoS_2$ and iron sulfide such as FeS, $FeS_2$ and $Li_xFeS_2$.

Examples of the metal nitride include lithium-cobalt nitride (for example, $Li_xCo_yN$, where 0<x<4, 0<y<0.5).

Among these compounds, the negative electrode active material preferably contains one type selected from lithium titanate having a spinel structure such as $Li_{4+x}Ti_5O_{12}$, FeS and $FeS_2$, and the most preferable negative electrode active material is lithium titanate having a spinel structure. Lithium titanate having a spinel structure is superior in the ability of receiving lithium ions. Therefore, it is possible to form a coating film having a low resistance on the surface of the negative electrode by specifying initial charging conditions. Therefore, the large-current cycle performance can be improved remarkably by making the Gurley value of the outermost layer larger than that of the inner layer.

Examples of the above conductive agent may include acetylene black, Ketjen Black, graphite and metal powders.

Examples of the above binder include polytetrafluoroethylene (PTFE), polyvinylidene fluoride (PVdF), fluorine-based rubber and styrene butadiene rubber.

The proportions of the above negative electrode active material, conductive agent and binder are preferably in the range of 80 to 98% by weight, in the range of 0 to 20% by weight and in the range of 2 to 7% by weight, respectively.

In the case of using a lithium alloy foil, the alloy foil may be used as a band-like electrode as it is.

It is desirable for the current collector of the negative electrode to be formed of aluminum foil or aluminum alloy foil. It is also desirable for the negative electrode current collector to have an average crystal grain size not larger than 50 μm. In this case, the mechanical strength of the current collector can be drastically increased so as to make it possible to increase the density of the negative electrode by applying the pressing under a high pressure to the negative electrode. As a result, the battery capacity can be increased. Also, since it is possible to prevent the dissolution and corrosion deterioration of the negative electrode current collector in an over-discharge cycle under an environment of a high temperature not lower than, for example, 40° C., it is possible to suppress the elevation in the impedance of the negative electrode. Further, it is possible to improve the high-rate performance, the rapid charging performance, and the charge-discharge cycle performance of the battery. It is more desirable for the average crystal grain size of the negative electrode current collector to be not larger than 30 μm, furthermore desirably, not larger than 5 μm.

It is desirable for the aluminum foil or the aluminum alloy foil to have a thickness not larger than 20 μm, more desirably not larger than 15 μm. Also, it is desirable for the aluminum foil to have a purity not lower than 99%. It is desirable for the aluminum alloy to contain another element such as magnesium, zinc or silicon. On the other hand, it is desirable for the amount of the transition metal such as iron, copper, nickel and chromium contained in the aluminum alloy to be not larger than 1%.

4) Nonaqueous Electrolyte

This nonaqueous electrolyte contains a nonaqueous solvent and an electrolyte salt dissolved in this nonaqueous solvent. Also, the nonaqueous solvent may contain a polymer.

Examples of the electrolyte salt include lithium salts such as $LiPF_6$, $LiBF_4$, $Li(CF_3SO_2)_2N$ (bistrifluoromethanesulfonylamide lithium (popular name: LiTFSI)), $LiCF_3SO_3$ (popular name: LiTFS), $Li(C_2F_5SO_2)_2N$ (bispentafluoroethanesulfonylamide lithium (popular name: LiBETI)), LiClO$_4$, LiAsF$_6$, LiSbF$_6$, lithium bis-oxalatoborate(LiB(C$_2$O$_4$)$_2$ (popular name: LiBOB)) and difluoro(trifluoro-2-oxide-2-trifluoro-methylpropionate(2-)-0,0) lithium borate (LiBF$_2$(OCOOC(CF$_3$)$_2$) (popular name: LiBF$_2$(HHIB))). These electrolyte salts may be used either singly or in combination of two or more. Particularly, LiPF$_6$ and LiBF$_4$ are preferable.

Here, the concentration of the electrolyte salt is preferably in the range of 1.5 to 3 M. When the concentration of the electrolyte salt is less than 1.5 M, there is a possibility of deterioration in performance under high-load current. When the concentration of the electrolyte salt exceeds 3 M, the viscosity is increased and there is therefore a likelihood that the performance under high-load current will deteriorate even if the ratio of (X/Y) and the structure of the separator are specified.

Examples of the nonaqueous solvent include, though not particularly limited to, propylene carbonate (PC), ethylene carbonate (EC), 1,2-dimethoxyethane (DME), γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC) and dipropyl carbonate (DPC). These solvents may be used either singly or in combination of two or more. Among these solvents, γ-butyrolactone is preferable. Also, when two or more solvents are combined, these solvents are all preferably selected from those having a dielectric constant of 20 or more.

Additives may be added to this nonaqueous electrolyte. Examples of these additives include, though not particularly limited to, vinylene carbonate (VC), vinylene acetate (VA), vinylene butylate, vinylene hexanate, vinylene crotonate and catechol carbonate. The concentration of the additives is preferably in the range of 0.1 to 3 wt % with respect to 100 wt % of the nonaqueous electrolyte. A more preferable range is 0.5 to 1 wt %.

Figure 6:
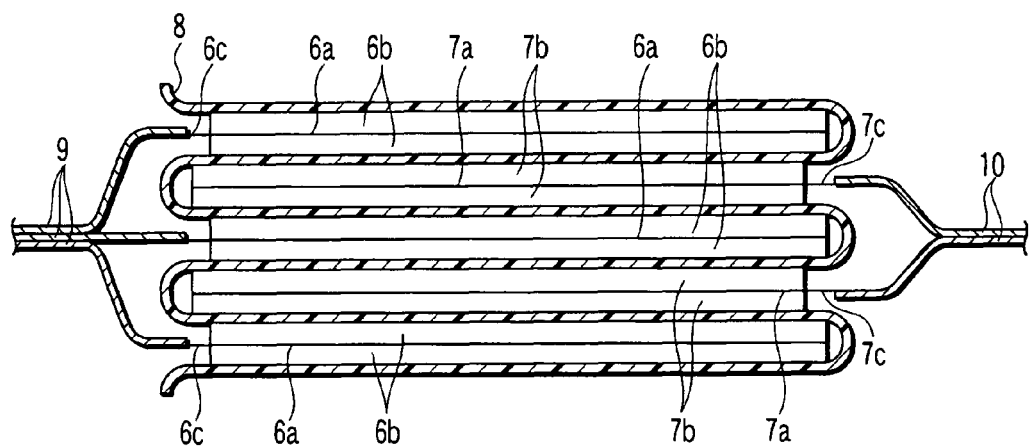
FIG. 6 is a side view typically showing another electrode group of a laminated structure used in the nonaqueous electrolyte battery according to the first embodiment.

In FIG. 1, the welded part of the positive electrode lead tab 9 and the positive electrode lead 6c and the welded part of the negative electrode lead tab 10 and the negative electrode lead 7c are disposed on the outside of the separator 8. However, these welded parts may be made to face the separator 8 as illustrated in FIG. 6.

Figure 7:
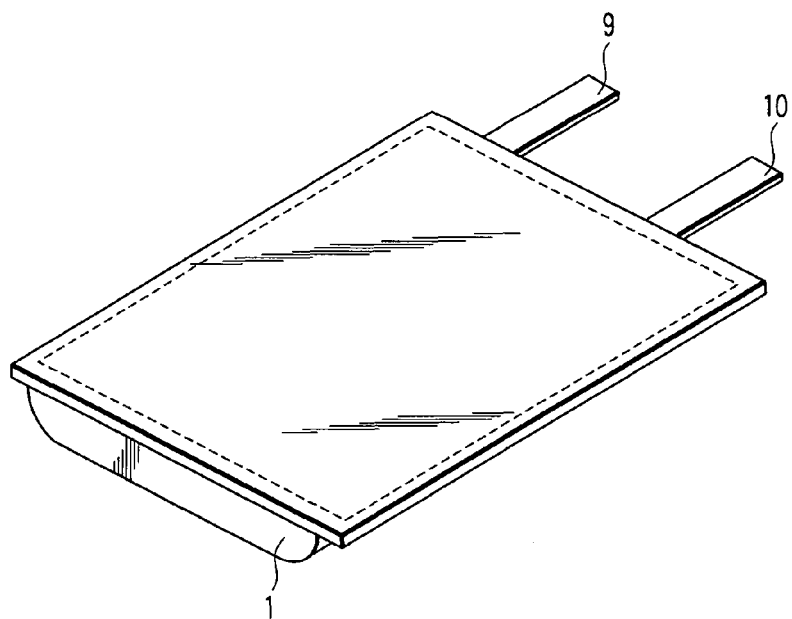
FIG. 7 is a perspective view showing another nonaqueous electrolyte battery according to the first embodiment.

Also, in FIG. 1, the direction in which the positive electrode lead tab 9 is drawn and the direction in which the negative electrode lead tab 10 is drawn are opposite to each other. However, as illustrated in FIG. 7, the end of the positive electrode lead tab 9 and the end of the negative electrode lead tab 10 may be drawn from the same heat seal part (sealing part) of the container 1 to draw the both in the same direction.

Second Embodiment

A battery pack according to a second embodiment has plural nonaqueous electrolyte batteries according to the first embodiment. It is preferable that the nonaqueous electrolyte battery according to the first embodiment be used as a unit cell and the unit cells be electrically connected in series or in parallel to constitute a battery module.

The nonaqueous electrolyte battery according to the first embodiment is suitable for the assembling of the battery module and the battery pack according to the second embodiment is superior in large-current performance. Explanations will be furnished as to this.

Because the nonaqueous electrolyte battery according to the first embodiment can supress the generation of heat under a large current, it is possible to remarkably reduce an individual difference in battery capacity and impedance. As a result, fluctuation of the voltage of the unit cell at a fully charged state due to individual difference of the capacity can be reduced, for example, in the battery module in which the unit cells are connected in series. Accordingly, the battery pack of the second embodiment is excellent in controllability of the battery module, and has the improved large-current performance.

Figure 8:
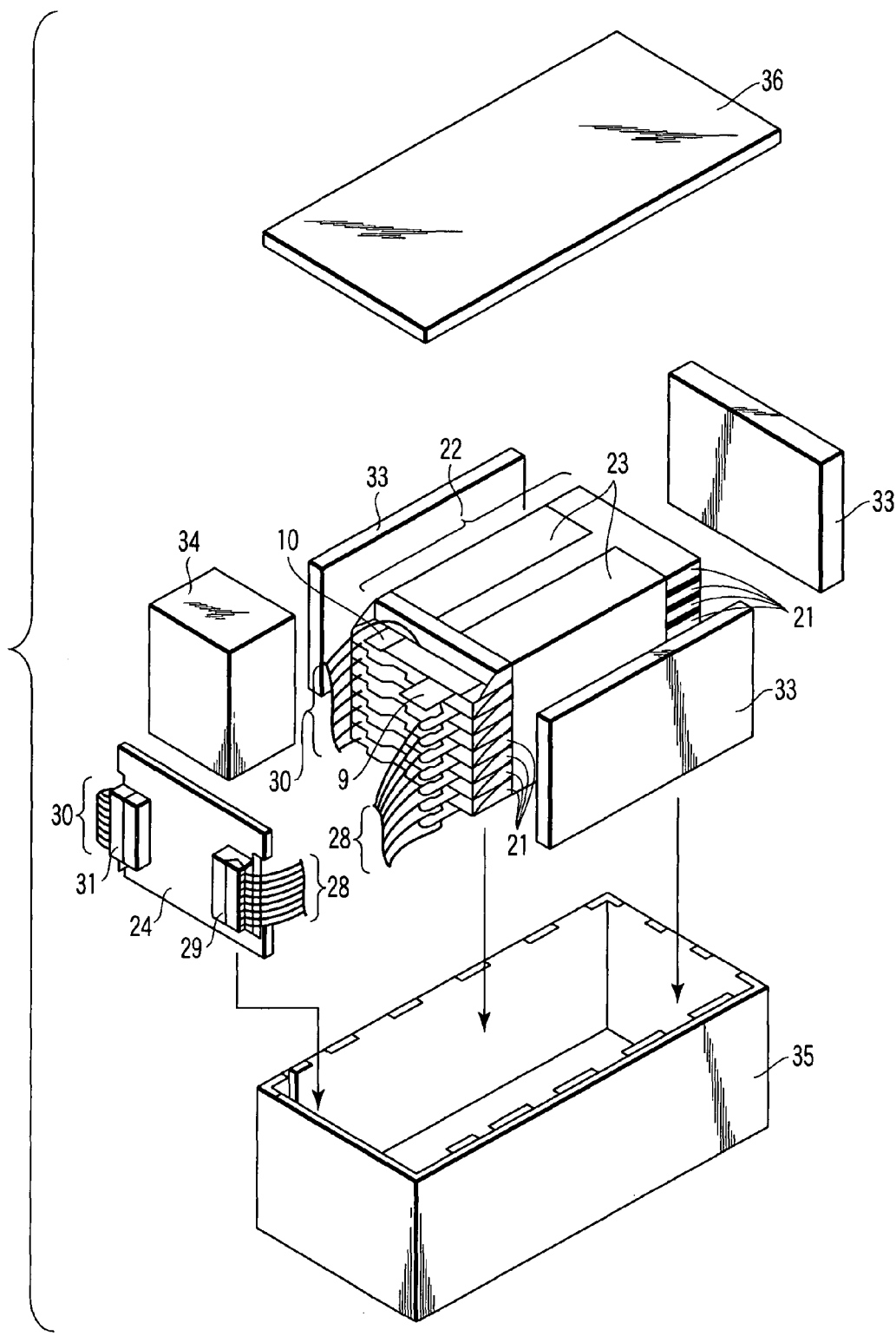
FIG. 8 is an exploded perspective view of a battery pack according to a second embodiment.
Figure 9:
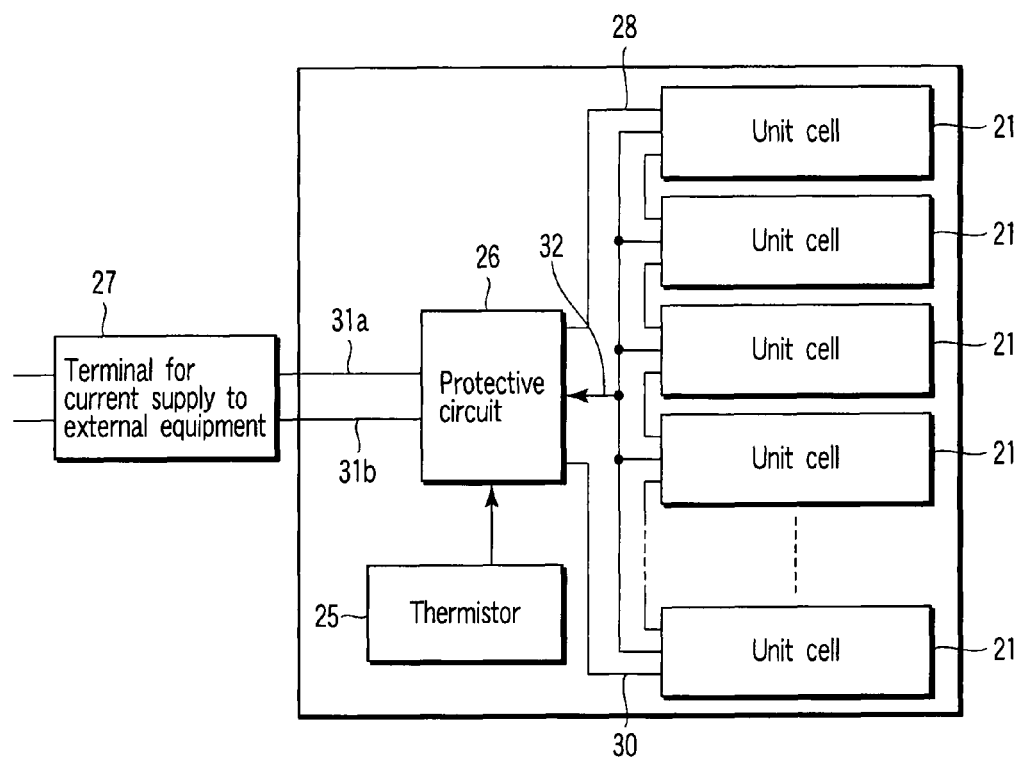
FIG. 9 is a block diagram showing an electric circuit of the battery pack of FIG. 8.

Each of a plurality of unit cells 21 included in the battery pack shown in FIG. 8 is formed of, though not limited to, a flattened type nonaqueous electrolyte battery constructed as shown in FIG. 7. It is possible to use the flattened type nonaqueous electrolyte battery shown in FIGS. 1 to 6 as the unit cell 21. The plural unit cells 21 are stacked one upon the other in the thickness direction in a manner to align the protruding directions of the positive electrode lead tabs 9 and the negative electrode lead tabs 10. As shown in FIG. 9, the unit cells 21 are connected in series to form a battery module 22. The unit cells 21 forming the battery module 22 are made integral by using an adhesive tape 23 as shown in FIG. 8.

A printed wiring board 24 is arranged on the side surface of the battery module 22 toward which protrude the positive electrode lead tabs 9 and the negative electrode lead tabs 10. As shown in FIG. 9, a thermistor 25, a protective circuit 26 and a terminal 27 for current supply to the external equipment are connected to the printed wiring board 24.

As shown in FIGS. 8 and 9, a wiring 28 on the side of the positive electrodes of the battery module 22 is electrically connected to a connector 29 on the side of the positive electrode of the protective circuit 26 mounted to the printed wiring board 24. On the other hand, a wiring 30 on the side of the negative electrodes of the battery module 22 is electrically connected to a connector 31 on the side of the negative electrode of the protective circuit 26 mounted to the printed wiring board 24.

The thermistor 25 detects the temperature of the unit cell 21 and transmits the detection signal to the protective circuit 26. The protective circuit 26 is capable of breaking a wiring 31a on the positive side and a wiring 31b on the negative side, the wirings 31a and 31b being stretched between the protective circuit 26 and the terminal 27 for current supply to the external equipment. These wirings 31a and 31b are broken by the protective circuit 26 under prescribed conditions including, for example, the conditions that the temperature detected by the thermistor is higher than a prescribed temperature, and that the over-charging, over-discharging and over-current of the unit cell 21 have been detected. The detecting method is applied to the unit cells 21 or to the battery module 22. In the case of applying the detecting method to each of the unit cells 21, it is possible to detect the battery voltage, the positive electrode potential or the negative electrode potential. On the other hand, where the positive electrode potential or the negative electrode potential is detected, lithium electrodes used as reference electrodes are inserted into the unit cells 21.

In the case of FIG. 9, a wiring 32 is connected to each of the unit cells 21 for detecting the voltage, and the detection signal is transmitted through these wirings 32 to the protective circuit 26.

Protective sheets 33 each formed of rubber or resin are arranged on the three of the four sides of the battery module 22, though the protective sheet 33 is not arranged on the side toward which protrude the positive electrode lead tabs 9 and the negative electrode lead tabs 10. A protective block 34 formed of rubber or resin is arranged in the clearance between the side surface of the battery module 22 and the printed wiring board 24.

The battery module 22 is housed in a container 35 together with each of the protective sheets 33, the protective block 34 and the printed wiring board 24. To be more specific, the protective sheets 33 are arranged inside the two long sides of the container 35 and inside one short side of the container 35. On the other hand, the printed wiring board 24 is arranged along that short side of the container 35 which is opposite to the short side along which one of the protective sheets 33 is arranged. The battery module 22 is positioned within the space surrounded by the three protective sheets 33 and the printed wiring board 24. Further, a lid 36 is mounted to close the upper open edge of the container 35.

Incidentally, it is possible to use a thermally shrinkable tube in place of the adhesive tape 23 for fixing the battery module 22. In this case, the protective sheets 33 are arranged on both sides of the battery module 22 and, after the thermally shrinkable tube is wound about the protective sheets, the tube is thermally shrunk to fix the battery module 22.

The unit cells 21 shown in FIGS. 8 and 9 are connected in series. However, it is also possible to connect the unit cells 21 in parallel to increase the cell capacity. Of course, it is possible to connect the battery packs in series and in parallel.

Also, the embodiments of the battery pack can be changed appropriately depending on the use of the battery pack.

The battery pack in the second embodiment is preferably used in applications that need cycle performance under a high load current (large current). Specific examples of these applications include power sources for digital cameras, applications for vehicles such as two- to four-wheel hybrid electric cars, two- to four-wheel electric cars and assist bicycles and chargeable vacuum cleaners. The battery pack according to this embodiment has a high effect on an improvement in highly deep charge and discharge cycles and is therefore suitable to chargeable vacuum cleaners and electric cars.

Third Embodiment

A vehicle according to a third embodiment comprises the battery pack according to the second embodiment. Examples of the vehicle referred here include two- to four-wheel hybrid electric cars, two- to four-wheel electric cars and assist bicycles.

Figure 12:
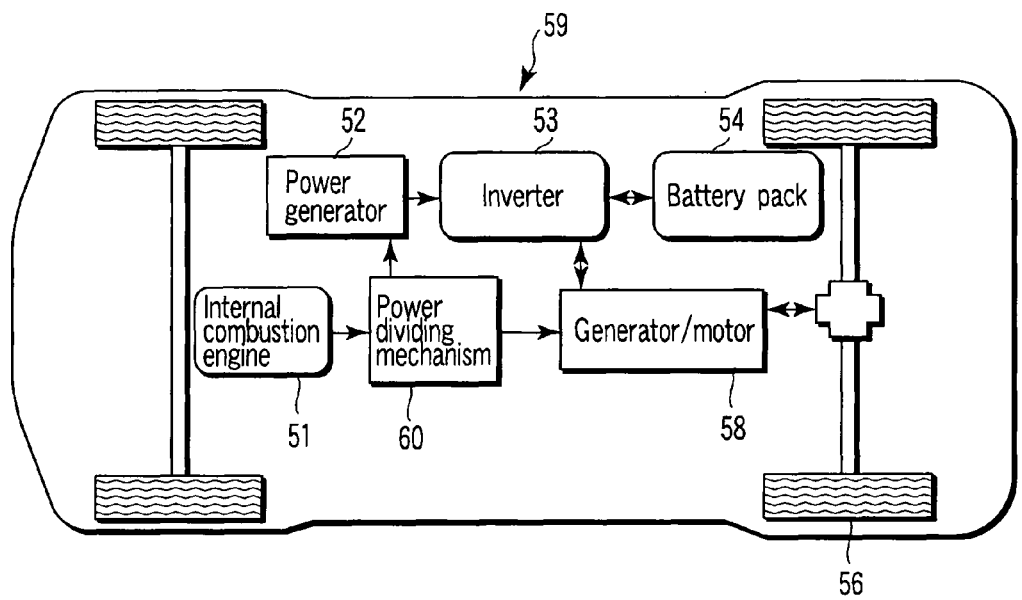
FIG. 12 is a typical view showing a series-parallel hybrid car according to the third embodiment.

FIGS. 10 to 12 show various type of hybrid vehicles in which an internal combustion engine and a motor driven by a battery module system are used in combination as the power source for the driving. For driving the vehicle, required is the power source exhibiting a wide range of the rotation speed and the torque depending on the running conditions of the vehicle. Since the torque and the rotation speed exhibiting an ideal energy efficiency are limited in the internal combustion engine, the energy efficiency is lowered under the driving conditions other than the limited torque and the rotation speed. Since the hybrid vehicle includes the internal combustion engine and the electric motor, it is possible to improve the energy efficiency of the vehicle. Specifically, the internal combustion engine is operated under the optimum conditions so as to generate an electric power, and the wheels are driven by a high-efficiency electric motor, or the internal combustion engine and the electric motor are operated simultaneously, thereby improving the energy efficiency of the vehicle. Also, by recovering the kinetic energy of the vehicle in the decelerating stage as the electric power, the running distance per unit amount of the fuel can be drastically increased, compared with the vehicle that is driven by the internal combustion engine alone.

The hybrid vehicle can be roughly classified into three types depending on the combination of the internal combustion engine and the electric motor.

FIG. 10 shows a hybrid vehicle 50 that is generally called a series hybrid vehicle. The motive power of an internal combustion engine 51 is once converted entirely into an electric power by a power generator 52, and the electric power thus converted is stored in a battery pack 54 via an inverter 53. The battery pack according to the second embodiment is used as the battery pack 54. The electric power stored in the battery pack 54 is supplied to an electric motor 55 via the inverter 53, with the result that wheels 56 are driven by the electric motor 55. In other words, the hybrid vehicle 50 shown in FIG. 10 represents a system in which a power generator is incorporated into an electric vehicle. The internal combustion engine can be operated under highly efficient conditions and the kinetic energy of the internal combustion engine can be recovered as the electric power. On the other hand, the wheels are driven by the electric motor alone and, thus, the hybrid vehicle 50 requires an electric motor of a high output. It is also necessary to use a battery pack having a relatively large capacity. It is desirable for the rated capacity of the battery pack to fall within a range of 5 to 50 Ah, more desirably 10 to 20 Ah. Incidentally, the rated capacity noted above denotes the capacity at the time when the battery pack is discharged at a rate of 0.2 C.

FIG. 11 shows the construction of a hybrid vehicle 57 that is called a parallel hybrid vehicle. A reference numeral 58 shown in FIG. 11 denotes an electric motor that also acts as a power generator. The internal combustion engine 51 drives mainly the wheels 56. The motive power of the internal combustion engine 51 is converted in some cases into an electric power by the power generator 58, and the battery pack 54 is charged by the electric power produced from the power generator 58. In the starting stage or the accelerating stage at which the load is increased, the driving force is supplemented by the electric motor 58. The hybrid vehicle 57 shown in FIG. 11 represents a system based on the ordinary vehicle. In this system, the fluctuation in the load of the internal combustion engine 51 is suppressed so as to improve the efficiency, and the regenerative power is also obtained. Since the wheels 56 are driven mainly by the internal combustion engine 51, the output of the electric motor 58 can be determined arbitrarily depending on the required ratio of the assistance. The system can be constructed even in the case of using a relatively small electric motor 58 and a relatively small battery pack 54. The rated capacity of the battery pack can be set to fall within a range of 1 to 20 Ah, more desirably 5 to 10 Ah.

FIG. 12 shows the construction of a hybrid vehicle 59 that is called a series-parallel hybrid vehicle, which utilizes in combination both the series type system and the parallel type system. A power dividing mechanism 60 included in the hybrid vehicle 59 divides the output of the internal combustion engine 51 into the energy for the power generation and the energy for the wheel driving. The series-parallel hybrid vehicle 59 permits controlling the load of the engine more finely than the parallel hybrid vehicle so as to improve the energy efficiency.

It is desirable for the rated capacity of the battery pack to fall within a range of 1 to 20 Ah, more desirably 5 to 10 Ah.

It is desirable for the nominal voltage of the battery pack included in the hybrid vehicles as shown in FIGS. 10 to 12 to fall within a range of 200 to 600 V.

The battery pack according to embodiments of the present invention is adapted for use in the series-parallel hybrid vehicle.

Figure 13:
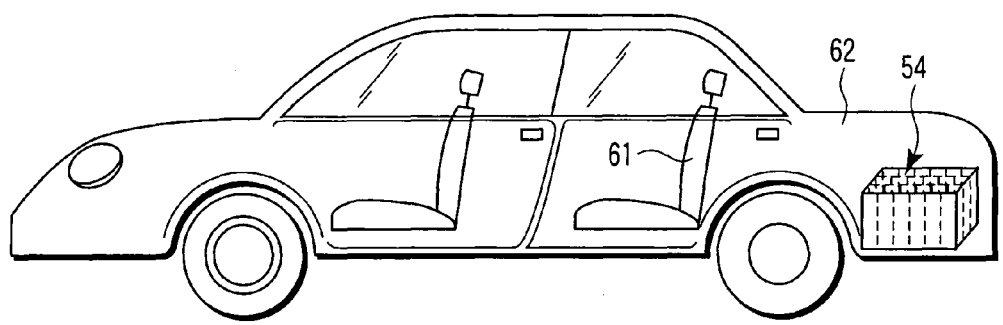
FIG. 13 is a typical view showing a car according to the third embodiment.

It is desirable for the battery pack 54 to be arranged in general in the site where the battery pack 54 is unlikely to be affected by the change in the temperature of the outer atmosphere and unlikely to receive an impact in the event of a collision. In, for example, a sedan type automobile shown in FIG. 13, the battery pack 54 can be arranged within a trunk room rearward of a rear seat 61. The battery pack 54 can also be arranged below or behind the rear seat 61. Where the battery has a large weight, it is desirable to arrange the battery pack 54 below the seat or below the floor in order to lower the center of gravity of the vehicle.

An electric vehicle (EV) is driven by the energy stored in the battery pack that is charged by the electric power supplied from outside the vehicle. Therefore, it is possible for the electric vehicle to utilize the electric energy generated at a high efficiency by, for example, another power generating equipment. Also, since the kinetic energy of the vehicle can be recovered as the electric power in the decelerating stage of the vehicle, it is possible to improve the energy efficiency during the driving of the vehicle. It should also be noted that the electric vehicle does not discharge at all the waste gases such as a carbon dioxide gas and, thus, the air pollution problem need not be worried about at all. On the other hand, since all the power required for the driving of the vehicle is produced by an electric motor, it is necessary to use an electric motor of a high output. In general, it is necessary to store all the energy required for one driving in the battery pack by one charging. It follows that it is necessary to use a battery pack having a very large capacity. It is desirable for the rated capacity of the battery pack to fall within a range of 100 to 500 Ah, more desirably 200 to 400 Ah.

The weight of the battery pack occupies a large ratio of the weight of the vehicle. Therefore, it is desirable for the battery pack to be arranged in a low position that is not markedly apart from the center of gravity of the vehicle. For example, it is desirable for the battery pack to be arranged below the floor of the vehicle. In order to allow the battery pack to be charged in a short time with a large amount of the electric power required for the one driving, it is necessary to use a charger of a large capacity and a charging cable. Therefore, it is desirable for the electric vehicle to be equipped with a charging connector connecting the charger and the charging cable. A connector utilizing the electric contact can be used as the charging connector. It is also possible to use a non-contact type charging connector utilizing the inductive coupling.

Figure 14:
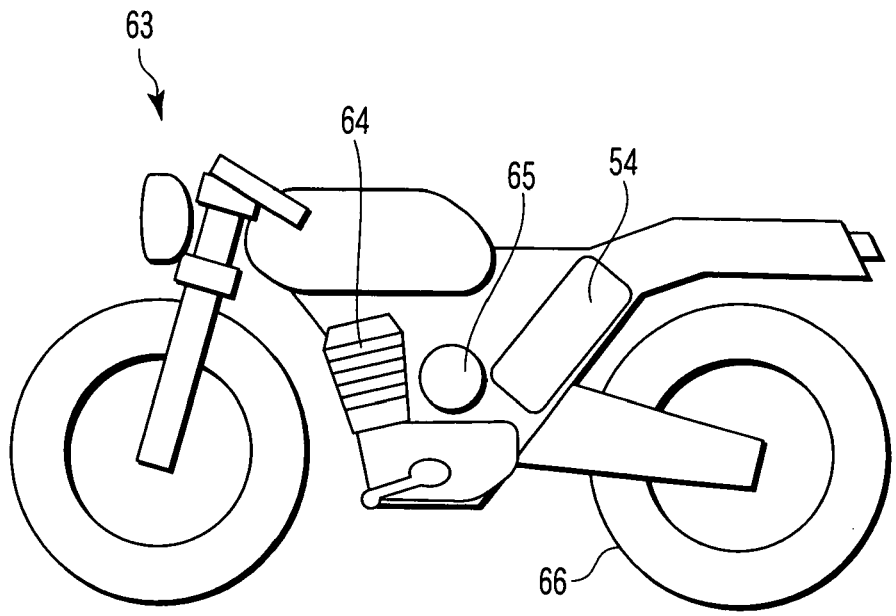
FIG. 14 is a typical view showing a hybrid motorcycle according to the third embodiment.

FIG. 14 exemplifies the construction of a hybrid motor bicycle 63. It is possible to construct a hybrid motor bicycle 63 exhibiting a high energy efficiency and equipped with an internal combustion engine 64, an electric motor 65, and the battery pack 54 like the hybrid vehicle. The internal combustion engine 64 drives mainly the wheels 66. In some cases, the battery pack 54 is charged by utilizing a part of the motive power generated from the internal combustion engine 64. In the starting stage or the accelerating stage in which the load of the motor bicycle is increased, the driving force of the motor bicycle is supplemented by the electric motor 65. Since the wheels 66 are driven mainly by the internal combustion engine 64, the output of the electric motor 65 can be determined arbitrarily based on the required ratio of the supplement. The electric motor 65 and the battery pack 54, which are relatively small, can be used for constructing the system. It is desirable for the rated capacity of the battery pack to fall within a range of 1 to 20 Ah, more desirably 3 to 10 Ah.

Figure 15:
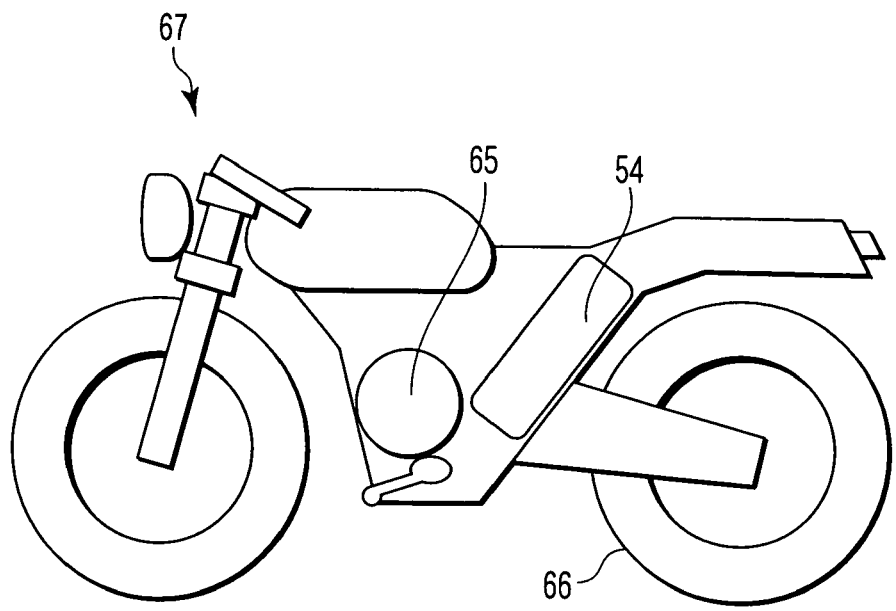
FIG. 15 is a typical view showing an electric motorcycle according to the third embodiment.

FIG. 15 exemplifies the construction of an electric motor bicycle 67. The electric motor bicycle 67 is driven by the energy stored in the battery pack 54 that is charged by the supply of the electric power from the outside. Since all the driving force required for the driving the motor bicycle 67 is generated from the electric motor 65, it is necessary to use the electric motor 65 of a high output. Also, since it is necessary for the battery pack to store all the energy required for one driving by one charging, it is necessary to use a battery pack having a relatively large capacity. It is desirable for the rated capacity of the battery pack to fall within a range of 10 to 50 Ah, more desirably 15 to 30 Ah.

Fourth Embodiment

Figure 16:
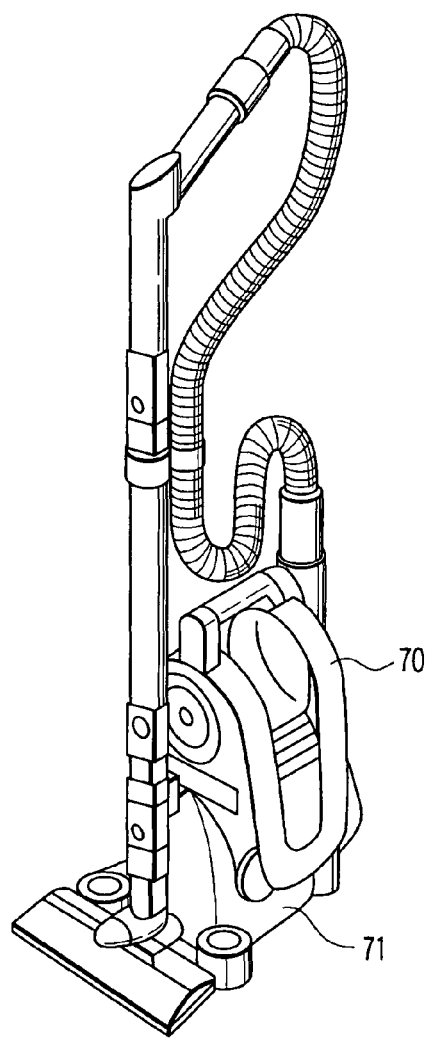
FIG. 16 is a typical view showing a chargeable vacuum cleaner according to a fourth embodiment.
Figure 17:
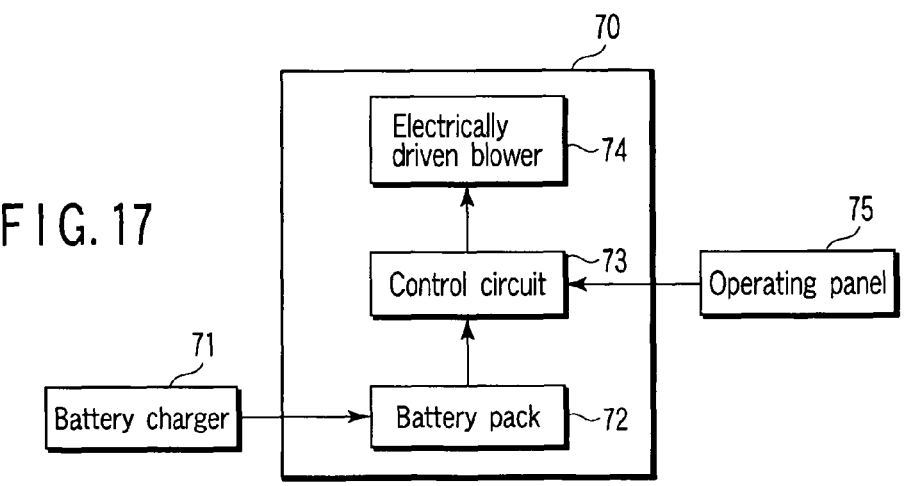
FIG. 17 is a structural view of the chargeable vacuum cleaner of FIG. 16.

FIGS. 16 and 17 show an example of a rechargeable vacuum cleaner according to a fourth embodiment. The rechargeable vacuum cleaner comprises an operating panel 75 which selects operation modes, an electrically driven blower 74 comprising a fun motor for generating suction power for dust collection, and a control circuit 73. A battery pack 72 according to the second embodiment as a power source for driving these units are housed in a casing 70. When the battery pack is housed in such a portable device, the battery pack is desirably fixed with interposition of a buffer material in order to prevent the battery pack from being affected by vibration. Known technologies may be applied for maintaining the battery pack at an appropriate temperature. While a battery charger 71 that also serves as a setting table functions as the battery charger of the battery pack according to the second embodiment, a part or all of the function of the battery charger may be housed in the casing 70.

While the rechargeable vacuum cleaner consumes a large electric power, the rated capacity of the battery pack is desirably in the range of 2 to 10 Ah, more preferably 2 to 4 Ah, in terms of portability and operation time. The nominal voltage of the battery pack is desirably in the range of 40 to 80 V.

Examples of the present invention will be explained in detail with reference to the drawings.

EXAMPLE 1

<Production of Positive Electrode>

$LiCoO_2$ was used as a positive electrode active material. The positive electrode active material was formulated with a graphite powder as a conductive agent in an amount of 8% by weight and with PVdF as a binder in an amount of 5% by weight with respect to the total amount of the positive electrode. The mixture was dispersed in n-methylpyrrolidone (NMP) to prepare a slurry. The obtained slurry was applied to a 15-μm-thick aluminum foil having an average crystal grain size of 4 μm, dried and made to pass through a press step, to thereby manufacture a positive electrode having a density of 3.6 $g/cm^3$. The obtained positive electrode was punched, whereby a positive electrode current collector non-coated with the slurry was made to project from one end of the short side to form a positive electrode lead as shown in FIG. 3.

<Production of Negative Electrode>

85 parts by weight of $Li_4Ti_5O_{12}$ (average particle diameter: 0.90 μm), 5 parts by weight of $Li_4Ti_5O_{12}$ (average particle diameter: 3.40 μm) and 10 parts by weight of PVdF as a binder were mixed in a N-methylpyrrolidone (NMP) solution to prepare a slurry. The obtained slurry was applied to a current collector made of a 15-μm-thick aluminum foil having an average crystal grain size of 4 μm, dried and pressed, to thereby manufacture a negative electrode having a density of 2.2 $g/cm^3$. The obtained negative electrode was punched, whereby a negative electrode current collector non-coated with the slurry was made to project from one end of the short side to form a negative electrode lead.

<Preparation of Nonaqueous Electrolyte>

Ethylene carbonate (EC) and γ-butyrolactone (GBL) were mixed in a ratio by volume of 1:2. 2 M of $LiBF_4$ was mixed in the obtained mixed solvent to make a nonaqueous electrolyte.

<Assembling of Battery>

20 layers of the negative electrode and 21 layers of the positive electrode were prepared. A band-like separator made of a polypropylene porous film was folded in a zigzag form, and the positive electrode and the negative electrode were alternately interposed between the overlapped parts of the folded separator to manufacture an electrode group having a laminated structure as shown in FIG. 4. When the positive electrode was sandwiched between the overlapped parts of the folded separator, the end of the positive electrode lead was made to project from the separator. When the negative electrode was sandwiched, the end of the negative electrode lead was also made to project from the separator, and it projected in a direction opposite to the direction in which the end of the positive electrode lead projected. Also, the separator was folded in a zigzag form such that the Gurley value of a separator layer positioned most outside among the separator layers constituting the electrode group was 106 [sec/100 cc] and each Gurley value of separator layers positioned at the inner side than the above outermost separator layer was 102 [sec/100 cc]. A difference (%) between the Gurley value of the inner layer and that of the outermost layer and the increase rate (%) of the Gurley value when the separator was allowed to stand at 80° C. for 3 hours are shown in Table 1 below.

The end of the positive electrode lead which the positive electrode 21 layers each have was drawn externally from the separator and the positive electrode leads are put in a collected state to weld the collected ends to an aluminum positive electrode lead tab. The end of the negative electrode lead which the negative electrode 20 layers each have was drawn externally from the separator and the negative electrode leads are put in a collected state to weld the collected ends to an aluminum negative electrode lead tab. The area where the positive electrode lead was welded to the positive electrode lead tab was designed to be 1% of the area of the positive electrode layer and the area where the negative electrode lead was welded to the negative electrode lead tab was designed to be 1% of the area of the negative electrode layer.

This electrode group was molded into a flat form by pressing. The electrode group molded into a flat form was inserted into a container made of an aluminum-containing laminated film 0.1 mm in thickness to manufacture a flat-type nonaqueous electrolyte battery having a thickness of 4.5 mm, a width of 70 mm and a height of 110 mm as shown in FIG. 1.

The obtained battery was initially charged: constant current-constant voltage charging, 20° C., 0.1 C, 2.7 V, 20 hours. Then, the rated resistance X [mΩ] and rated capacity Y [mAh] of this battery were measured. The values of (X/Y) are shown in Table 1 below.

The obtained battery was operated in a large-current cycle in which it was charged at 25° C. under a current of 10 C until the voltage of the battery reached 2.7 V and discharged under a current of 10 C until the voltage of the battery reached 1.5 V. As a consequence, in the 2420th cycle, the capacity of the battery reached 90% of the discharge capacity in the first cycle, showing that the battery was superior in large-current cycle performance.

EXAMPLE 2

As shown in FIG. 6, a battery was manufactured and subjected to the cycle test in the same manner as in Example 1 except that the welded part of the positive electrode lead and the positive electrode lead tab and the welded part of the negative electrode lead and the negative electrode lead tab were disposed so as to face the separator. In the 2210th cycle, the capacity of the battery reached 90% of the discharge capacity in the first cycle.

EXAMPLE 3

As shown in FIG. 7, a battery was manufactured and subjected to the cycle test in the same manner as in Example 1 except that the positive electrode lead tab 9 and the negative electrode lead tab 10 were drawn from the same heat seal part of the container 1, that is, the positive electrode lead tab 9 and the negative electrode lead tab 10 were drawn in the same direction.

EXAMPLE 4

A battery was manufactured and subjected to the cycle test in the same manner as in Example 1 except that the initial charge condition was changed to constant current-constant voltage charging, 45° C., 0.2 C, 2.7 V and 10 hours, to thereby set the values of (X/Y) to those shown in Table 1 below.

EXAMPLE 5

A battery was manufactured and subjected to the cycle test in the same manner as in Example 1 except that the initial charge condition was changed to constant current-constant voltage charging, 15° C., 0.05 C, 2.7 V and 40 hours, to thereby set the values of (X/Y) to those shown in Table 1 below.

EXAMPLES 6 to 12

Batteries were manufactured in the same manner as in Example 1 except that the welded area and the increase rate of the Gurley value of the separator at 80° C. were changed to those shown in Table 1 below.

EXAMPLES 13 to 16

Batteries were manufactured and subjected to the cycle test in the same manner as in Example 1 except that each Gurley value of the outermost layer and the inner layers was changed to those shown in Table 1 below to thereby set the values of (X/Y) to those shown in Table 1 below.

EXAMPLES 17 to 18

Batteries were manufactured and subjected to the cycle test in the same manner as in Example 1 except that the Gurley value of the outermost layer was increased by the difference shown in the following Table 2 compared to the Gurley value of the inner layer.

COMPARATIVE EXAMPLE 1

A battery was manufactured and subjected to the cycle test in the same manner as in Example 1 except that as the separator, one having no difference in Gurley value was used. At this time, in the 2000th cycle, the capacity of the battery reached 90% of the discharge capacity in the first cycle.

COMPARATIVE EXAMPLE 2

A battery was manufactured and subjected to the cycle test in the same manner as in Example 1 except that the amount of slurry to be applied when the positive electrode and the negative electrode were manufactured was reduced and the values of (X/Y) were set to those shown in Table 2 below. At this time, in the 2500th cycle, the capacity of the battery reached 90% of the discharge capacity in the first cycle.

COMPARATIVE EXAMPLE 3

A battery was manufactured and subjected to the cycle test in the same manner as in Example 1 except that the structure of the electrode group was changed to a coiled shape and the values of (X/Y) were set to those shown in Table 2 below. At this time, in the 600th cycle, the capacity of the battery reached 90% of the discharge capacity in the first cycle.

COMPARATIVE EXAMPLE 4

A battery was manufactured and subjected to the cycle test in the same manner as in Example 1 except that the amount of slurry to be applied when the positive electrode and the negative electrode were manufactured was reduced, the values of (X/Y) were set to those shown in Table 2 below and as the separator, one having no difference in Gurley value was used. At this time, in the 2500th cycle, the capacity of the battery reached 90% of the discharge capacity in the first cycle.

TABLE 1

| | | Structure | Outermost layer (sec/100 cc) | Inner layer (sec/100 cc) | Difference (%) | Increase rate (%) | Ratio of resistances (X/Y) | Welded part | Direction of tab | Welded area (%) | Number of cycles |
|---|---|---|---|---|---|---|---|---|---|---|---|
| Example | 1 | Folded in zigzag manner | 106 | 102 | 3.92 | 3 | $1 \times 10^{-4}$ | Outer side relative to separator | Opposite direction | 1 | 2420 |
| Example | 2 | Folded in zigzag manner | 106 | 102 | 3.92 | 3 | $1 \times 10^{-4}$ | Inner side relative to separator | Opposite direction | 1 | 2210 |
| Example | 3 | Folded in zigzag manner | 106 | 102 | 3.92 | 3 | $1 \times 10^{-4}$ | Outer side relative to separator | Same direction | 1 | 2080 |
| Example | 4 | Folded in zigzag manner | 106 | 102 | 3.92 | 3 | $3 \times 10^{-5}$ | Outer side relative to separator | Opposite direction | 1 | 2450 |
| Example | 5 | Folded in zigzag manner | 106 | 102 | 3.92 | 3 | $1.5 \times 10^{-3}$ | Outer side relative to separator | Opposite direction | 1 | 2010 |
| Example | 6 | Folded in zigzag manner | 106 | 102 | 3.92 | 3 | $1 \times 10^{-4}$ | Outer side relative to separator | Opposite direction | 0.18 | 2130 |
| Example | 7 | Folded in zigzag manner | 106 | 102 | 3.92 | 3 | $1 \times 10^{-4}$ | Outer side relative to separator | Opposite direction | 0.2 | 2300 |
| Example | 8 | Folded in zigzag manner | 106 | 102 | 3.92 | 3 | $1 \times 10^{-4}$ | Outer side relative to separator | Opposite direction | 5 | 2440 |
| Example | 9 | Folded in zigzag manner | 106 | 102 | 3.92 | 3 | $1 \times 10^{-4}$ | Outer side relative to separator | Opposite direction | 5.5 | 2450 |
| Example | 10 | Folded in zigzag manner | 106 | 102 | 3.92 | 0.1 | $1 \times 10^{-4}$ | Outer side relative to separator | Opposite direction | 1 | 2400 |
| Example | 11 | Folded in zigzag manner | 106 | 102 | 3.92 | 5 | $1 \times 10^{-4}$ | Outer side relative to separator | Opposite direction | 1 | 2250 |
| Example | 12 | Folded in zigzag manner | 106 | 102 | 3.92 | 5.5 | $1 \times 10^{-4}$ | Outer side relative to separator | Opposite direction | 1 | 2100 |

TABLE 2

| | | Structure | Outermost Layer (sec/100 cc) | Inner layer (sec/100 cc) | Difference (%) | Increase rate (%) | Ratio of resistances (X/Y) | Welded part | Direction of tab | Welded area (%) | Number of cycles |
|---|---|---|---|---|---|---|---|---|---|---|---|
| Example | 13 | Folded in zigzag manner | 45 | 42 | 7.14 | 3 | $8 \times 10^{-5}$ | Outer side relative to separator | Opposite direction | 1 | 2080 |
| Example | 14 | Folded in zigzag manner | 53 | 50 | 6.00 | 3 | $8.1 \times 10^{-5}$ | Outer side relative to separator | Opposite direction | 1 | 2250 |
| Example | 15 | Folded in zigzag manner | 300 | 290 | 3.45 | 3 | $1.8 \times 10^{-4}$ | Outer side relative to separator | Opposite direction | 1 | 2200 |
| Example | 16 | Folded in zigzag manner | 310 | 302 | 2.65 | 3 | $1.9 \times 10^{-4}$ | Outer side relative to separator | Opposite direction | 1 | 2050 |

TABLE 2-continued

|  | | Structure | Outermost Layer (sec/100 cc) | Inner layer (sec/100 cc) | Difference (%) | Increase rate (%) | Ratio of resistances (X/Y) | Welded part | Direction of tab | Welded area (%) | Number of cycles |
|---|---|---|---|---|---|---|---|---|---|---|---|
| Example | 17 | Folded in zigzag manner | 106 | 105 | 0.1 | 3 | $1 \times 10^{-4}$ | Outer side relative to separator | Opposite direction | 1 | 2100 |
| Example | 18 | Folded in zigzag manner | 106 | 85 | 20 | 3 | $1 \times 10^{-4}$ | Outer side relative to separator | Opposite direction | 1 | 2200 |
| Comparative Example | 1 | Folded in zigzag manner | 106 | 106 | 0.00 | 3 | $1 \times 10^{-4}$ | Outer side relative to separator | Opposite direction | 1 | 2000 |
| Comparative Example | 2 | Folded in zigzag manner | 106 | 102 | 3.92 | 3 | $2.5 \times 10^{-5}$ | Outer side relative to separator | Opposite direction | 1 | 2500 |
| Comparative Example | 3 | Coiled | 106 | 102 | 3.92 | 3 | $2 \times 10^{-3}$ | Outer side relative to separator | Opposite direction | 1 | 600 |
| Comparative Example | 4 | Folded in zigzag manner | 106 | 106 | 0.00 | 3 | $2.5 \times 10^{-5}$ | Outer side relative to separator | Opposite direction | 1 | 2500 |

From the comparison of Examples 1 to 5 with Comparative Example 1 in Tables 1 and 2, it is understood that if the Gurley value of the outermost layer of the separator is made larger than that of the inner layer when (X/Y) is $3 \times 10^{-5}$ or more and $1.5 \times 10^{-3}$ or less, the battery is superior in large-current cycle performance. If a coiled type electrode group as described in the foregoing JP-A 2005-93077 (KOKAI) is used, (X/Y) exceeds $1.5 \times 10^{-3}$ as shown in Comparative Example 3, because the resistance of the battery is large. Even if the Gurley value of the outermost layer of the separator is made larger than that of the inner layer in such a case, the battery significantly deteriorates in large-current cycle performance.

Also, from the comparison of Comparative Example 2 with Comparative Example 4, it is understood that when (X/Y) is less than $3 \times 10^{-5}$, there is no effect on large-current cycle performance even if the Gurley value of the outermost layer of the separator is made larger than that of the inner layer. Here, Comparative Example 2 was compared with Comparative Example 4 in discharge performance under a current of 50 C and as a result, it was confirmed that Comparative Example 2 further deteriorated by 50% compared with Comparative Example 4. Namely, it was confirmed that if the Gurley value of the outermost layer of the separator is made larger than that of the inner layer when (X/Y) is less than $3 \times 10^{-5}$, this exerts an adverse influence on large-current performance.

From the comparison of Example 1 with Example 2, it is understood that when the welded part of the positive electrode or negative electrode lead and lead tab is disposed on the outer side than the separator, the battery is rather superior in the large-current cycle performance. Moreover, from the comparison of Example 1 with Example 3, it has been understood that it is advantageous in improving large-current cycle performance that the positive electrode lead tab and the negative electrode lead tab are drawn in directions opposite to each other.

From the comparison among Examples 6 to 9, it is understood that when the area of the welded part is designed to be 0.2% or more, the large-current cycle performance is improved. Although Example 9 exhibited better cycle performance than Example 1, the comparison of Example 1 with Example 9 in battery energy density [mAh/cm³] revealed that Example 9 was more reduced by 3.5% in energy density than Example 1 and a high energy density was obtained by the battery of Example 1.

Also, from the comparison among Examples 10 to 12, it is understood that a better large-current cycle performance is rather obtained when the increase rate (%) of the Gurley value of the separator when the separator is allowed to stand at 80° C. for 3 hours is designed to be 0.1% or more and 5% or less.

The comparison among Examples 13 to 16 reveals that when the Gurley value of the separator is designed to be 50 [sec/100 cc] or more and 300 [sec/100 cc] or less, better large-current cycle performance is obtained.

It is also found from the comparison among Examples 1, 17 and 18 that when a difference in Gurley value between the outermost layer and the inner layer is made to be 0.5% or more and 10% or less, more superior large-current cycle performance is obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A nonaqueous electrolyte battery comprising:
   an electrode group having a laminated structure in which positive electrodes and negative electrodes are alternately interposed between overlapped parts of a separator folded in a zigzag form, a Gurley value of an outermost layer of the separator being larger than that of an inner layer; and
   a nonaqueous electrolyte,
   the battery satisfying the following equation (1):

$$3 \times 10^{-5} \leq (X/Y) \leq 1.5 \times 10^{-3} \tag{1}$$

wherein X is a rated resistance [mΩ] of the nonaqueous electrolyte battery and Y is a rated capacity [mAh] of the nonaqueous electrolyte battery.

2. The nonaqueous electrolyte battery according to claim 1, wherein each of the positive electrodes contains a positive electrode current collector, a positive electrode layer laminated on the positive electrode current collector and a positive electrode lead projecting from the positive electrode current collector, each of the negative electrodes contains a negative electrode current collector, a negative electrode layer laminated on the negative electrode current collector and a negative electrode lead projecting from the negative electrode current collector, and the nonaqueous electrolyte battery comprises a positive electrode lead tab welded to the positive electrode lead and a negative electrode lead tab welded to the negative electrode lead, and the welded part of the positive electrode lead and the positive electrode lead tab and the welded part of the negative electrode lead and the negative electrode lead tab project from the separator.

3. The nonaqueous electrolyte battery according to claim 2, wherein a direction in which the positive electrode lead projects is opposite to a direction in which the negative electrode lead projects.

4. The nonaqueous electrolyte battery according to claim 2, wherein an area of the welded part of the positive electrode lead and the positive electrode lead tab is 0.2 to 5% of an area of the positive electrode layer, and an area of the welded part of the negative electrode lead and the negative electrode lead tab is 0.2 to 5% of an area of the negative electrode layer.

5. The nonaqueous electrolyte battery according to claim 1, wherein (X/Y) is $5\times10^{-5}$ to $1\times10^{-3}$ (mΩ/mAh).

6. The nonaqueous electrolyte battery according to claim 1, wherein the Gurley value of the separator is 50 to 300 [sec/100 cc].

7. The nonaqueous electrolyte battery according to claim 1, wherein an increase rate of the Gurley value of the separator when the separator is allowed to stand at 80° C. for 3 hours is 0.1 to 5%.

8. The nonaqueous electrolyte battery according to claim 1, wherein the Gurley value of the outermost layer is larger by 0.1 to 20% than the Gurley value of the inner layer.

9. The nonaqueous electrolyte battery according to claim 1, wherein the Gurley value of the outermost layer is larger by 0.5 to 10% than the Gurley value of the inner layer.

10. The nonaqueous electrolyte battery according to claim 1, wherein each of the negative electrodes comprises a current collector made of aluminum having an average crystal grain size of 50 μm or less or an aluminum alloy having an average crystal grain size of 50 μm or less.

11. The nonaqueous electrolyte battery according to claim 1, wherein each of the negative electrodes contains a lithium-titanium oxide.

12. The nonaqueous electrolyte battery according to claim 11, wherein the lithium-titanium oxide has a spinel structure.

13. A battery pack comprising a nonaqueous electrolyte battery, the battery comprising:

an electrode group having a laminated structure in which positive electrodes and negative electrodes are alternately interposed between overlapped parts of a separator folded in a zigzag form, a Gurley value of an outermost layer of the separator being larger than that of an inner layer; and a nonaqueous electrolyte, the battery satisfying the following equation (1):

$$3\times10^{-5} \leq (X/Y) \leq 1.5\times10^{-3} \tag{1}$$

wherein X is a rated resistance [mΩ] of the nonaqueous electrolyte battery and Y is a rated capacity [mAh] of the nonaqueous electrolyte battery.

14. The battery pack according to claim 13, wherein each of the positive electrodes contains a positive electrode current collector, a positive electrode layer laminated on the positive electrode current collector and a positive electrode lead projects from the positive electrode current collector, each of the negative electrodes contains a negative electrode current collector, a negative electrode layer laminated on the negative electrode current collector and a negative electrode lead projects from the negative electrode current collector, and the nonaqueous electrolyte battery comprises a positive electrode lead tab welded to the positive electrode lead and a negative electrode lead tab welded to the negative electrode lead, and the welded part of the positive electrode lead and the positive electrode lead tab and the welded part of the negative electrode lead and the negative electrode lead tab project from the separator.

15. The battery pack according to claim 14, wherein a direction in which the positive electrode lead projects is opposite to a direction in which the negative electrode lead projects.

16. The battery pack according to claim 13, wherein (X/Y) is $5\times10^{-5}$ to $1\times10^{-3}$ (mΩ/mAh).

17. The battery pack according to claim 13, wherein the Gurley value of the separator is 50 to 300 [sec/100 cc].

18. The battery pack according to claim 13, wherein an increase rate of the Gurley value of the separator when the separator is allowed to stand at 80° C. for 3 hours is 0.1 to 5%.

19. The battery pack according to claim 13, wherein the Gurley value of the outermost layer is larger by 0.1 to 20% than the Gurley value of the inner layer.

20. A vehicle comprising the battery pack according to claim 13.

* * * * *